United States Patent [19]

Baecchi et al.

[11] Patent Number: 4,646,626
[45] Date of Patent: Mar. 3, 1987

[54] DISPENSING UNIT FOR MANUALLY-OPERATED HOT DRINK DISPENSING MACHINE WITH PRE-MANUFACTURED THROWAWAY CONTAINERS OF TWO SIZES

[75] Inventors: Alfredo Baecchi, Florence; Aldo Bozzolini, Sesto Fiorentino; Tancredo Santoni, Scandicci; Carlo Mori, Campi Bisenzio, all of Italy

[73] Assignee: Tutoespresso S.r.l., Florence, Italy

[21] Appl. No.: 664,482

[22] Filed: Oct. 24, 1984

[51] Int. Cl.[4] .............................................. A97J 31/24
[52] U.S. Cl. ................... 99/275; 99/289 R; 141/311 R
[58] Field of Search ............. 99/275, 295, 289 R, 99/300, 302 R, 302 P, 304, 307; 141/311

[56]  References Cited

U.S. PATENT DOCUMENTS 3,060,835 10/1962 Eads ....................................... 99/300
3,552,976 1/1971 King ..................................... 99/289 R
3,660,117 5/1972 Neely ........................................ 99/289
4,230,033 10/1980 Cuccia ................................ 99/289 R
4,254,694 3/1981 Illy .......................................... 99/323

Primary Examiner—Robert W. Jenkins
Attorney, Agent, or Firm—McAulay, Fields, Fisher, Goldstein & Nissen

[57] ABSTRACT

In a manually operated hot drink dispensing machine for use with a pre-manufactured throwaway container, in order to use containers of two different sizes, that is, pre-manufactured for percolated and other beverages; a dispensing unit including a cylinder forming a sleeve for the containers during use, an inner cylinder forming two chambers suitable for forming a housing for the corresponding containers, and a water supply head equipped with several ports for hot water and a separate port for cold water. The cover of the containers is provided with two raised annular elements, suitable for forming a chamber communicating with the port for the cold water when a container, inserted into the cylinder, is pressed against the head, so as to permit the introduction into the container of only hot water, and into the container of hot and cold water.

6 Claims, 12 Drawing Figures

FIG. 3
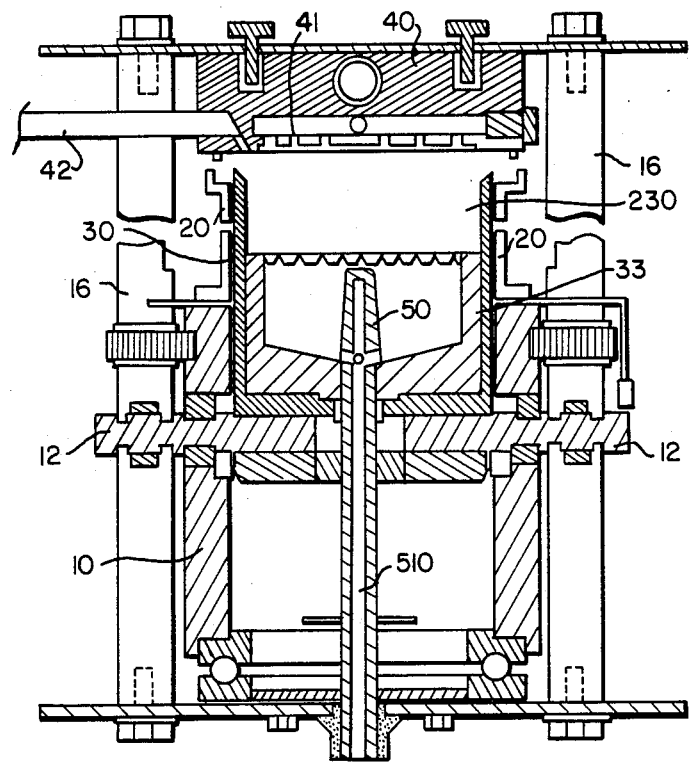
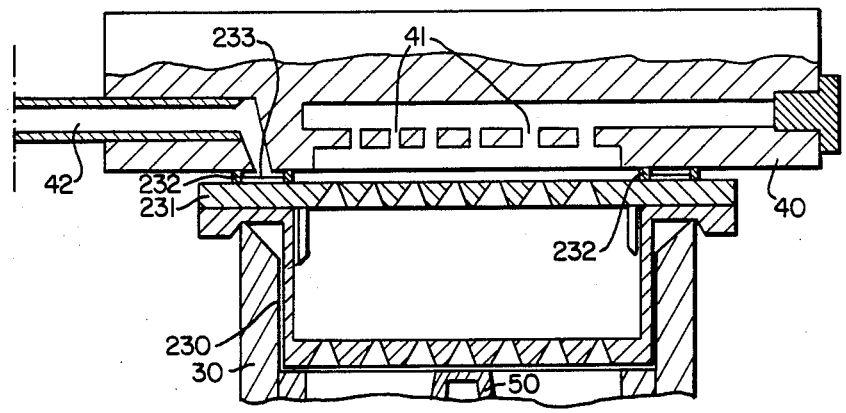
FIG. 4

FIG. 5
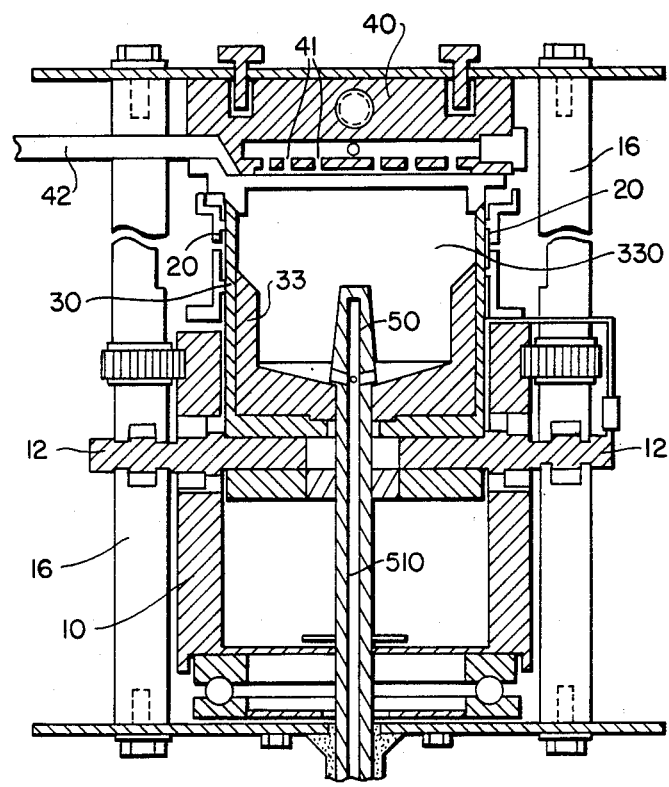
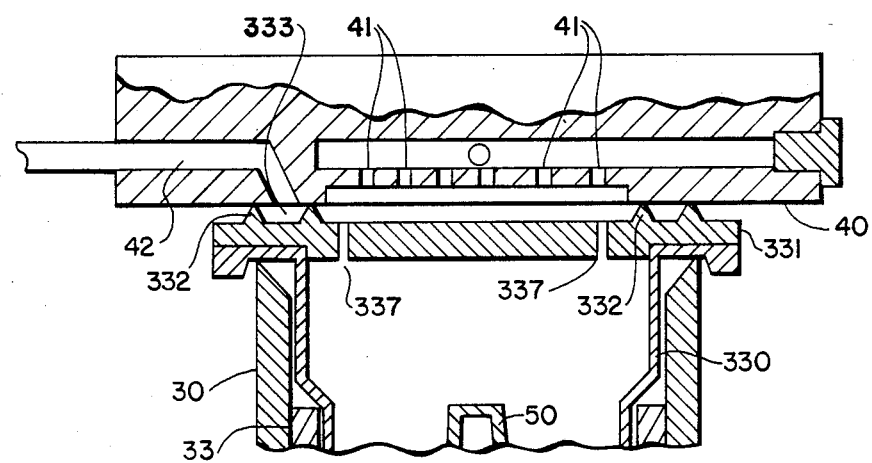
FIG. 6

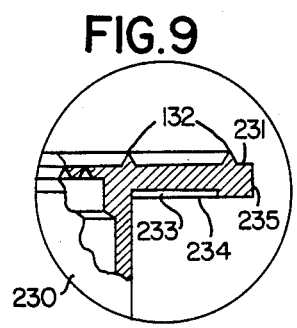
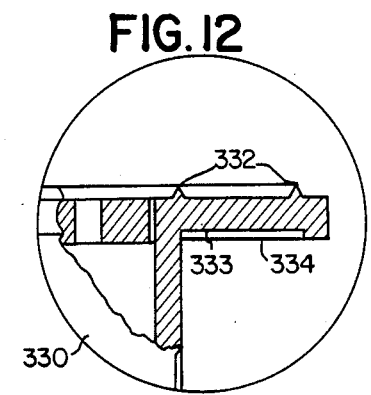
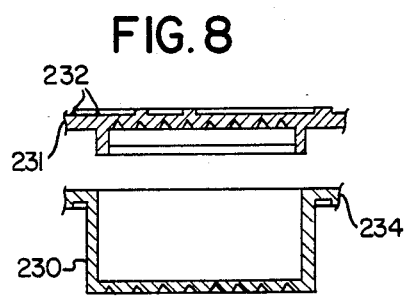
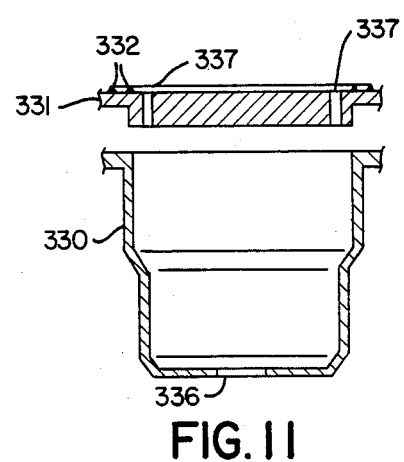
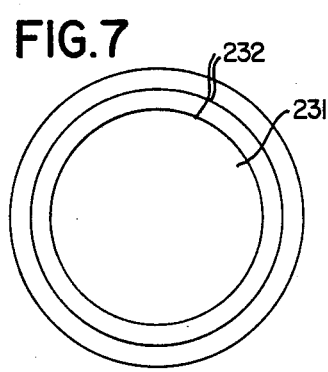
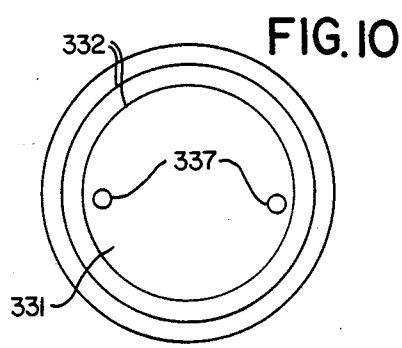

4,646,626

DISPENSING UNIT FOR MANUALLY-OPERATED HOT DRINK DISPENSING MACHINE WITH PRE-MANUFACTURED THROWAWAY CONTAINERS OF TWO SIZES

FIELD OF THE INVENTION

The invention concerns a dispensing unit for manually-operated hot drink dispensing machine with throwaway containers of two sizes.

There are known hot drink dispensing machines with pre-manufactured containers whose dispensing unit can use containers of one size only, so that, if it is designed to provide espresso coffee, which is a percolated drink from small-size containers, it is not capable of providing chocolate, cappuccino and similar suspension or solution drinks from large-size containers; this entails having to install at least two dispensing units in each dispensing machine.

There are also known hot drink dispensing machines with a dispensing unit suitable for both percolated and solution drinks, but in that case the containers used, which must still be of the same overall dimensions, are of a large size also for espresso coffee, and this entails a higher cost in manufacturing the containers.

Furthermore, considering that the water to be introduced into the containers must be at a temperature of approx. 95° C. for espresso coffee and at approx. 70° C. for the other drinks, the presently known hot drink dispensing machines are equipped with a hot and cold water system either with two boilers for the water at two different temperatures or otherwise with a single boiler and at least one electric valve on the cold water pipe and some control circuits which must be operated by the user whenever requesting the dispensing of a drink other than espresso coffee.

OBJECTS AND SUMMARY OF THE INVENTION

An object of the present invention is to eliminate all these drawbacks by means of an automatic dispensing unit for hot drink dispensing machine with pre-manufactured throwaway containers of both small and large size, that is, both for percolated espresso coffee and for solution or suspension of beverages. According to the present invention there is provided a machine having a cylinder sleeve for a container with two compartments capable of forming the appropriate housing for the two container sizes, small and large, and a water outlet head with several ports for hot water and a separate port for cold water, and a combination of, of small and large containers, respectively, with a cover equipped with two raised elements capable of intercepting, that is, closing completely or in part, respectively, the cold water port when the capsule is pressed by said sleeve cylinder against said head, so that, with a small-size container, the head can only supply hot water and, with a large-size container, both hot water and cold water are supplied.

The advantages obtained from the present invention essentially consist in that with the same dispensing unit it is possible to use, as desired, small- and large-size pre-manufactured containers; that the hot and cold water system is considerably simplified in comparison with that currently used with hot drink dispensing machines; that the supply of water at the appropriate temperature, depending on the desired type of drink, is automated and without any intervention on the part of the user; that the containers used are easy to manufacture and not of appreciably higher cost in comparison with those presently known; that the containers used constitute a guarantee of the product contained in them and therefore favor consumer protection.

BRIEF DESCRIPTION OF THE DRAWINGS

The invention will now be described below in greater detail with the aid of drawings showing only one possible embodiment.

In the drawing.

FIG. 3 shows an axial vertical section of the unit in FIG. 1, containing a small-size container;

FIG. 4 shows an enlarged axial vertical section of the contact area between the container and the water supply head of the unit in FIG. 3;

FIG. 5 shows an axial vertical section of the unit in FIG. 1, containing a large-size container;

FIG. 6 shows an enlarged axial vertical section of the contact area between the container and the water supply head of the unit in FIG. 5;

FIG. 7 shows a plan view of a small-size container to be used in a dispensing unit according to the invention;

FIG. 8 shows an axial vertical section of the container in FIG. 7;

FIG. 9 shows a vertical section of an enlarged detail of the cover of the container in FIG. 7;

FIG. 10 shows a plan view of a large-size container for a dispensing unit according to the invention;

FIG. 11 shows an axial vertical section of the container in FIG. 10; and

FIG. 12 shows a vertical section of an enlarged detail of the cover of the container in FIG. 10.

DESCRIPTION OF BEST MODE

Figure 1:
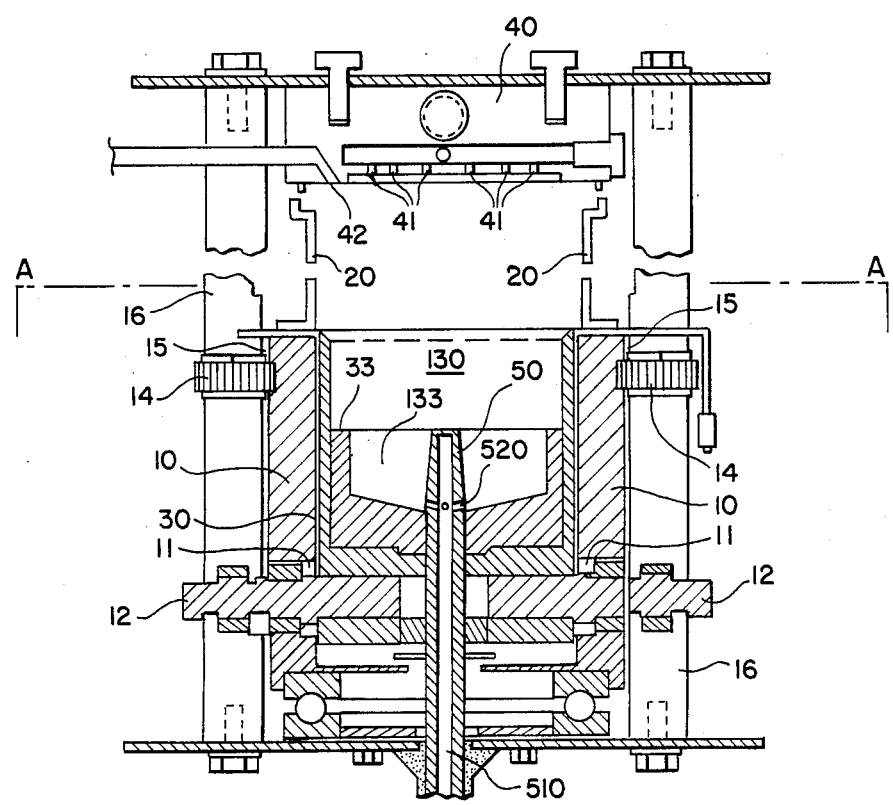
FIG. 1 shows an axial vertical view of a dispensing unit according to the invention, in the resting position.
Figure 2:
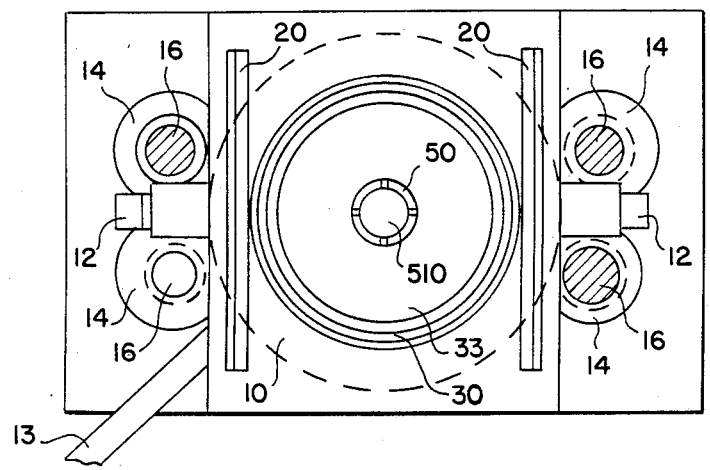
FIG. 2 shows a section view along AA in FIG. 1.

Considering its essential structure and with reference to FIGS. 1 through 6 in the attached drawings, a dispensing unit for a manually-operated hot drink dispensing machine with pre-manufactured throwaway containers of two sizes according to the invention comprises:

a tubular cam (10) with two diametrically opposite slots (11) FIG. 1 for the passage of two horizontal brackets (12) and with a lever (13) shown in FIG. 2 to control the horizontal rotation, in either direction, of the cam (10), which is held in its seat by the bushings (14) of a frame (16), engaging a horizontal groove (15) in the cam (10), while the brackets (12), guided between the uprights (16), are raised or lowered, respectively; above said cam (10) there are two horizontal, parallel, fixed guides, to hold the manually-introduced container in a hanging position;

a hollow cylinder (30), open at the top, forming a sleeve for the container while in use, with an inner hollow inner cylinder (33), open at the top and shorter than cylinder (30), from the center of whose funnel-shaped bottom there projects an integral element (50) in the shape of a truncated cone, with a flat head in the same plane as the mouth of said inner cylinder (33), to form a support for a small-size container or cup, and whose shaft, which extends downward, has an axial hole (510) and several transverse holes (520), communicating with the axial one (510); the lateral surface of the cylinder (30), left uncovered by the inner cylinder (33), forms a cylindrical chamber (130) suitable for housing a cylindrical container (230) of small size, that is, one suitable for espresso coffee, whereas the lateral surface and the bottom of the inner cylinder (33) form a cylindrical chamber (133) which, together with said chamber (130) in cylinder (30), forms a bicylindrical chamber, suitable for housing a large-size bicylindrical container (233), that is, one of those pre-manufactured with freeze-dried or water-dilutable powdered substances and therefore suitable for dissolved or suspended drinks;

a flat water supply head (40), with several ports (41) for hot water and a port (42), separate from the others (41), for cold water; hot and cold water to be supplied at the same pressure by a common pump.

With reference to FIGS. 7 through 9 in the attached drawings, a container (230) for percolated drinks has a cover (231) equipped with two annular, cuspidal, raised, concentric elements (232), positioned and sized to form an annular chamber (233), communicating with port (42) in the head (40), whose watertight seal is obtained by the compression of the container against the head (40), in combination with the resistance exerted by the ground coffee bed contained in the container; furthermore, the flange (234) in the body of the container is advantageously provided with a lower collar (235), suitable for anchoring the container to the sleeve cylinder (30), thereby preventing the container from reentering said cylinder (30) when the water under pressure flowing from the head (40) hits the container.

With reference to FIGS. 10 through 12 in the attached drawings, a container (330) for beverages is composed of a body with two cylindrical sections joined by a collar in the shape of a truncated cone, a bottom with a central area (336), thinner and pre-grooved to facilitate the passage of element (50) in the inner cylinder (33), and a cover (331) with two through holes (337), diametrically opposite and with two annular, cuspidal, raised, concentric elements (332), positioned so as to form an annular chamber (333), communicating with port (42) in the head (40); the element (332) closer to the center of the cover being subject to bending in a centripetal direction as a result of the slight lowering of the body of the container while being used and of its rapid emptying. The flange (334) in the body of container (330) is equipped with a lower collar (335) similar to collar (235) in container (230).

The operation of the unit is as follows. After introducing a container (230-330) up to the center of the guides (20), the lever (13) is fully rotated, thereby covering the upper lateral surface of the container with the sleeve cylinder (30), then lifting the container until it touches the water supply head (40), and finally compressing the flange in the container, obtaining a watertight seal; if the container is of small size (230), that is, for espresso coffee, the chamber (232) is closed, so that only hot water, flowing from the ports (41) in the head (40) passes through the container, and the espresso coffee flows from the pipe (510). Otherwise, if the container introduced is of large size (330), that is, for dissolved drinks, once it is lifted and pressed by the sleeve cylinder (30) against the head (40), the annular element (332) closer to the center of the cover (331) bends in a centripetal direction, so that the port (333) is open and the hot water flowing from the ports (41) is mixed with colder water flowing from the port (42) and, thus mixed, passes through the container, and the beverage flows from the pipe (510).

We claim:

1. In combination in a dispensing unit for manually operated beverage dispensing machines employing manually inserted throwaway containers, comprising an outer cylinder serving as a sleeve for said containers during use thereof:

a tubular cam surrounding said cylinder;

means for raising and lowering said cylinder;

horizontal parallel guides above said cam for maintaining a container in suspended position while in use;

an inner cylinder disposed in said outer cylinder;

and in said inner cylinder, a first cylindrical chamber housing a small container and a second cylindrical chamber communicating with said first cylindrical chamber;

a water supply head mounted above said outer cylinder, said head including a plurality of hot water-dispensing ports and a separate cold water-dispensing port;

and throwaway beverage containers having a cover including at least two annular, raised, concentric elements forming an annular chamber, said annular chamber communicating with said cold water dispensing port in said head and forming at least a partial seal for cold water.

2. The combination of claim 1, wherein said inner cylinder is integral with said outer cylinder and has a funnel-shaped bottom and an open upper mouth;

said inner cylinder having a central truncated element in the bottom thereof;

said element having a head lying in substantially the same plane as said mouth of said inner cylinder;

said element having a central shaft with an axial opening and a plurality of transverse openings.

3. The combination of claim 1, wherein said water supply head has its hot water parts and its cold water parts connected to a common pump.

4. The combination of claim 1, wherein said annular elements in said cover of said containers extend transversely until they touch each other and form a single element which intercepts said cold water part.

5. The combination of claim 1, wherein said container has a body formed of two cylindrical sections of decreasing diameter toward the bottom thereof joined together with a thinner and pre-grooved central area in the said bottom.

6. The combination of claim 1, wherein said containers include a flange with a lower collar.

* * * * *